United States Patent [19]

Sferrazza et al.

[11] Patent Number: 5,661,736
[45] Date of Patent: Aug. 26, 1997

[54] MULTIPLE USE TIMER AND METHOD FOR PULSE WIDTH GENERATION, ECHO FAILURE DETECTION, AND RECEIVE PULSE WIDTH MEASUREMENT

[75] Inventors: Paul K. Sferrazza, Branchburg; Joseph W. Harmon, East Brunswick, both of N.J.

[73] Assignee: Harris Corporation, Melbourne, Fla.

[21] Appl. No.: 395,591

[22] Filed: Feb. 28, 1995

[51] Int. Cl.$^6$ .................................................. G06F 11/00
[52] U.S. Cl. .......................... 371/62; 371/61; 395/185.08
[58] Field of Search .............................. 371/62, 61, 57.2, 371/32, 33, 34; 370/77; 395/185.08, 185.09

[56] References Cited

U.S. PATENT DOCUMENTS

| | | | |
|---|---|---|---|
| 4,705,970 | 11/1987 | Tumpaugh | 371/62 |
| 5,247,163 | 9/1993 | Ohno et al. | 395/185.08 |
| 5,374,927 | 12/1994 | MacTaggart et al. | 341/53 |
| 5,379,307 | 1/1995 | Ishibashi et al. | 371/62 |
| 5,412,803 | 5/1995 | Bartow et al. | 395/200.1 |

*Primary Examiner*—Robert W. Beausoliel, Jr.
*Assistant Examiner*—Trinh L. Tu
*Attorney, Agent, or Firm*—Rogers & Killeen

[57] ABSTRACT

A method and device for timing bit transitions in a data communication system includes a multi-purpose counter/decoder responsive to transmission of bit transitions and receipt of reflections of the transmitted bit transitions to (a) indicate when the next bit transition is to be transmitted after a bit transition has been received during normal operation, (b) indicate a fault when a reflection of the transmitted bit transition is not received within a predetermined time count, and (c) determining the duration of a received bit.

20 Claims, 5 Drawing Sheets

५,६६१,७३६

MULTIPLE USE TIMER AND METHOD FOR PULSE WIDTH GENERATION, ECHO FAILURE DETECTION, AND RECEIVE PULSE WIDTH MEASUREMENT

BACKGROUND OF THE INVENTION

The present invention relates generally to multiplexed communication systems, and more particularly to multiple access, carrier sense systems and methods, in which signal synchronization is accomplished by detecting changes of state of the communication data signal.

In multiplexed communication systems, some method of maintaining signal synchronization among the interconnected nodes is generally required. Various synchronization systems and methods are known, including utilizing a separate clocking signal; embedding a periodic synchronization symbol within the data stream; and synchronizing on each bit in the data stream.

Multiple access communication systems allow more than one node to transmit information on a shared communication channel or bus. In such systems, means may be provided to avoid simultaneous transmissions, including assignment of unique time slots to each node in which the time slots are measured from a synchronizing symbol; bus control via a bus master; and non-destructive arbitration.

With reference to FIG. 1, a data communication system may include bus 10 for connecting plural nodes 12 to plural microprocessors 14. The nodes 12 may include one or more microprocessors 14 and each microprocessor and/or node may include a circuit 16 for interfacing with the bus. The interface circuit 16 may include control logic 18, timing generator 20, a CRC generator 22, and an encoder/decoder 24 for generating data signals that match system specifications and for decoding signals received from the bus. A separate transceiver 26 may be provided.

In systems that synchronize on each bit in the data stream and use non-destructive arbitration, dominant and recessive symbols (bits) may be defined so that when multiple nodes transmit simultaneously, a recessive bit will appear on the bus only when all transmitting nodes simultaneously produce a recessive bit. In the event that a node transmits a dominant bit while one or more other nodes transmit recessive bits, the dominant bit will be transmitted on the bus. During arbitration, all nodes must "sense" the bit type which appears on the bus. If a node which is attempting to transmit a recessive bit detects a dominant bit on the bus that node must cease transmitting on the bus. Synchronization on bit boundaries by multiple nodes requires that each transmitting node initiate generation of each data bit at the end of the previous data bit as detected on the bus.

In such prior art systems, signal synchronization may be accomplished by detecting changes of state of the signal (a change of state being denoted a "transition"), and synchronization may be lost if a node is damaged so that it can no longer sense transitions on the bus. The damaged node will not be able to detect when one bit has ended and transmission of the next bit should commence. As a minimum this renders the node incapable of transmitting, and in certain systems can cause communications on the bus to be inhibited. In all cases it is desirable that such a fault be detected.

Messages are typically sent along the bus (single wire, or multiple wire) and at any given time the bus can be in either of two states: active (high) or passive (low). By way of example, a standard system (SAE Recommended Practice J1850, Class B Data Communication Network Interface, Sept. 1, 1993) establishes requirements for communications on a multiplexed bus. Multiple nodes may be connected to the bus and the bus is high if any one (or more) of the nodes is generating an active output, and the bus is low if no nodes are generating active outputs. The bus is in a passive state when at rest.

A message begins when the bus is first driven high, and each succeeding state transition (high to low, or low to high) transfers one bit of information until the message is complete. The definition of each bit is dependent on its state (high or low) and its duration, and such messages are appropriately described as Variable Pulse Width (VPW). As illustrated in FIG. 2, each message spans a frame, and begins with an active start of frame (SOF) bit, includes bytes of address information and data, and ends with a passive end of frame (EOF) bit. Messages are transmitted with the most significant bit (MSB) first. The duration of each bit is measured as the time between successive transitions, and there is one bit per transition. For the J1850 standard, durations of bits (TV values) and bit definitions have been established and are shown in Tables 1 and 2 below.

TABLE 1

J1850 Timing Pulse Value (TV) Definitions

| TV ID | DURATION (ALL TIMES IN µs) | | |
|---|---|---|---|
| | MINIMUM | NOMINAL | MAXIMUM |
| Illegal | 0 | N/A | ≦34 |
| TV1 | >34 | 64 | ≦96 |
| TV2 | >96 | 128 | ≦163 |
| TV3 | >163 | 200 | ≦239 |
| TV4 | >239 | 280 | N/A |
| TV5 | >239 | 300 | N/A |
| TV6 | >280 | 300 | N/A |

TABLE 2

Bit Definitions

| BIT | DEFINITION |
|---|---|
| 0 Data | Passive TV1 or Active TV2 |
| 1 Data | Active TVI or Passive TV2 |
| SOF (Start of Frame) | Active TV3 |
| EOD (End of Data) | Passive TV3 |
| EOF (End of Frame) | Passive TV4 |
| IFS (Inter-Frame Separation) | Passive TV6 |
| IDLE (Idle Bus) | Passive >TV6 Nominal |
| NB (Normalization Bit) | Active TV1 or Active TV2 |
| BRK (Break) | Active TV5 |

As is obvious, operation of such systems depends on accurate timing of bit duration, and to this end the encoder/decoders 24 of such systems may include binary counters that provide a count of the number of clock signals received since the last transition so that the system is re-synchronized on each bit. In the J1850 example above, a counter may count the number of microseconds from the last transition, the count between bit transitions thus being indicative of the bit duration (e.g., a count of 64 would indicate a TV1 bit).

Binary counters are well known and need not be discussed in detail for an understanding of the present invention. A binary counter provides a count signal indicating the number of clock signals received at the counter, and typically includes N serially connected stages, each for providing an output indicating its state has been changed. The clock signal may be provided synchronously, to all stages simultaneously so that counter output is always correct, or asynchronously, to the first stage so that the signal cascades through the stages and the counter output is only correct when the signal has cascaded to the last stage. Outputs from each stage are provided to a decoder array that provides a count signal.

Prior art systems typically include two counters, one for timing the duration of the outgoing bit so that it has the appropriate definition, and one for timing when the transmitted bit is sensed on the bus. If the transmitted bit is not sensed on the bus within a predetermined time period, a fault may exist in either the transmit or sense path. If the bit is received as expected (that is, the same state and bit duration, within specified limits), there is no fault and normal operation continues. As will be appreciated, the second counter adds cost and increases device size (e.g., chip area).

Accordingly, it is an object of the present invention to provide a novel method and device for timing the duration of bits in a data communication system that obviates the problems of the prior art.

It is another object of the present invention to provide a novel method and device for timing the duration of transmitted and received bits in a data communication system in which a single counter/decoder serves multiple purposes; timing received bit duration during normal operation, timing transmitted bit duration when transmitting, and/or timing reflections of bits from the bus to determine whether a fault may exist when transmitting.

It is yet another object of the present invention to provide a novel method and device for timing the duration of transmitted bits in a data communication system in which the counter/decoder starts a time count upon receipt of the reflection from the bus of the transmitted bit transition, and indicates that the next transition is to be sent at the end of a time count defined by the bit duration minus a bit travel time that is the time from transmission of a bit transition to receipt of the transmitted bit transition.

It is still another object of the present invention to provide a novel method and device for timing the duration of transmitted bits in a data communication system in which the counter/decoder starts a time count if the reflected bit transition is received, and indicates a fault if the reflected bit transition has not been received for a period of time longer than the bit travel time.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
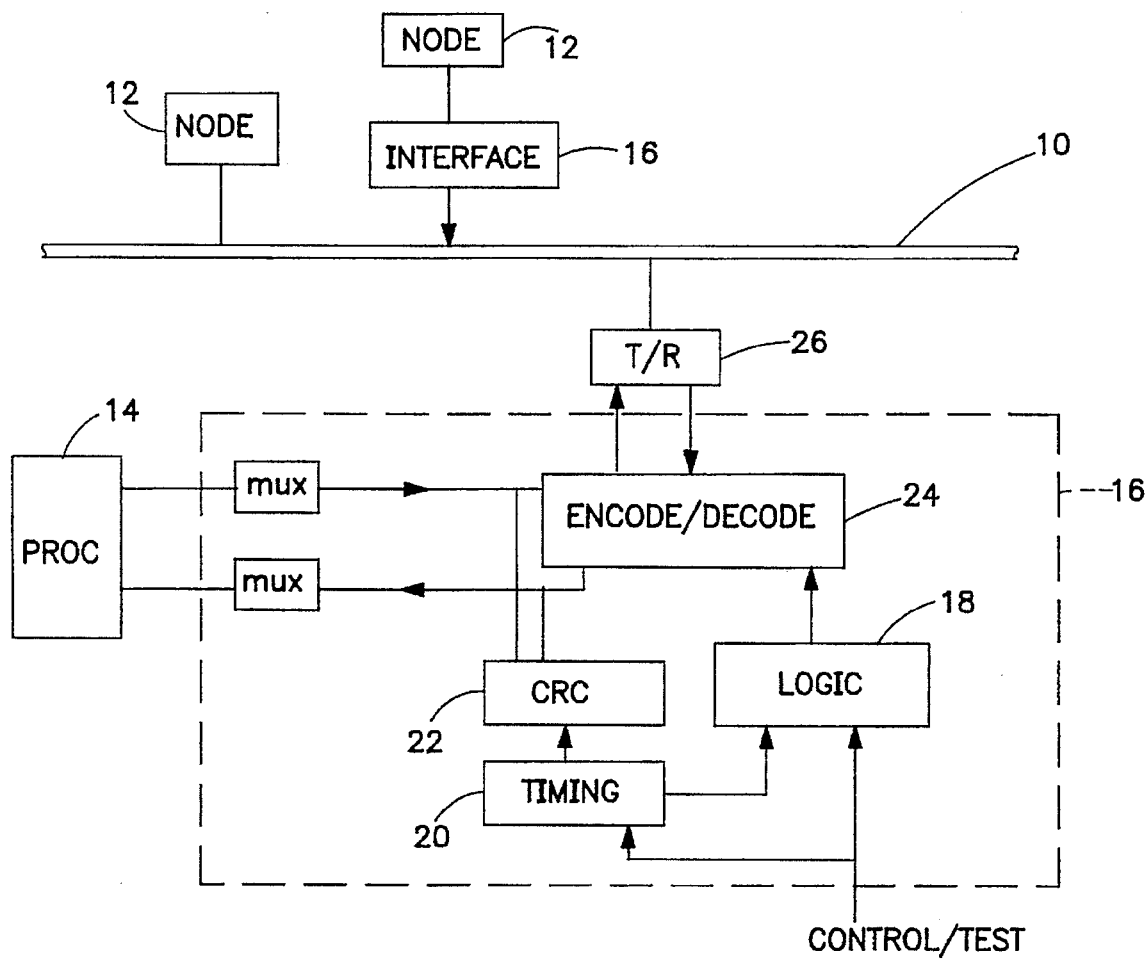
FIG. 1 is a block diagram of a bus interface system of the prior art in which the present invention may find application.
Figure 2:
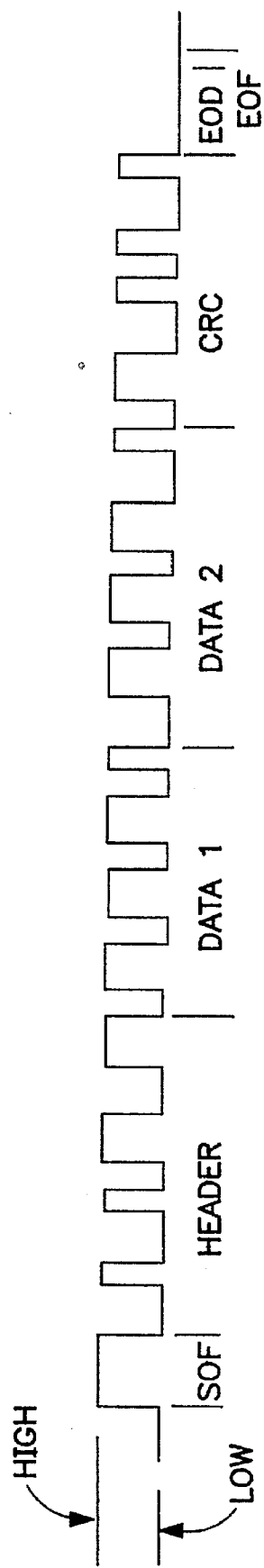
FIG. 2 is an illustration of a message frame in the SAE Recommended Practice J1850 with which the present invention may find application.
Figure 3:
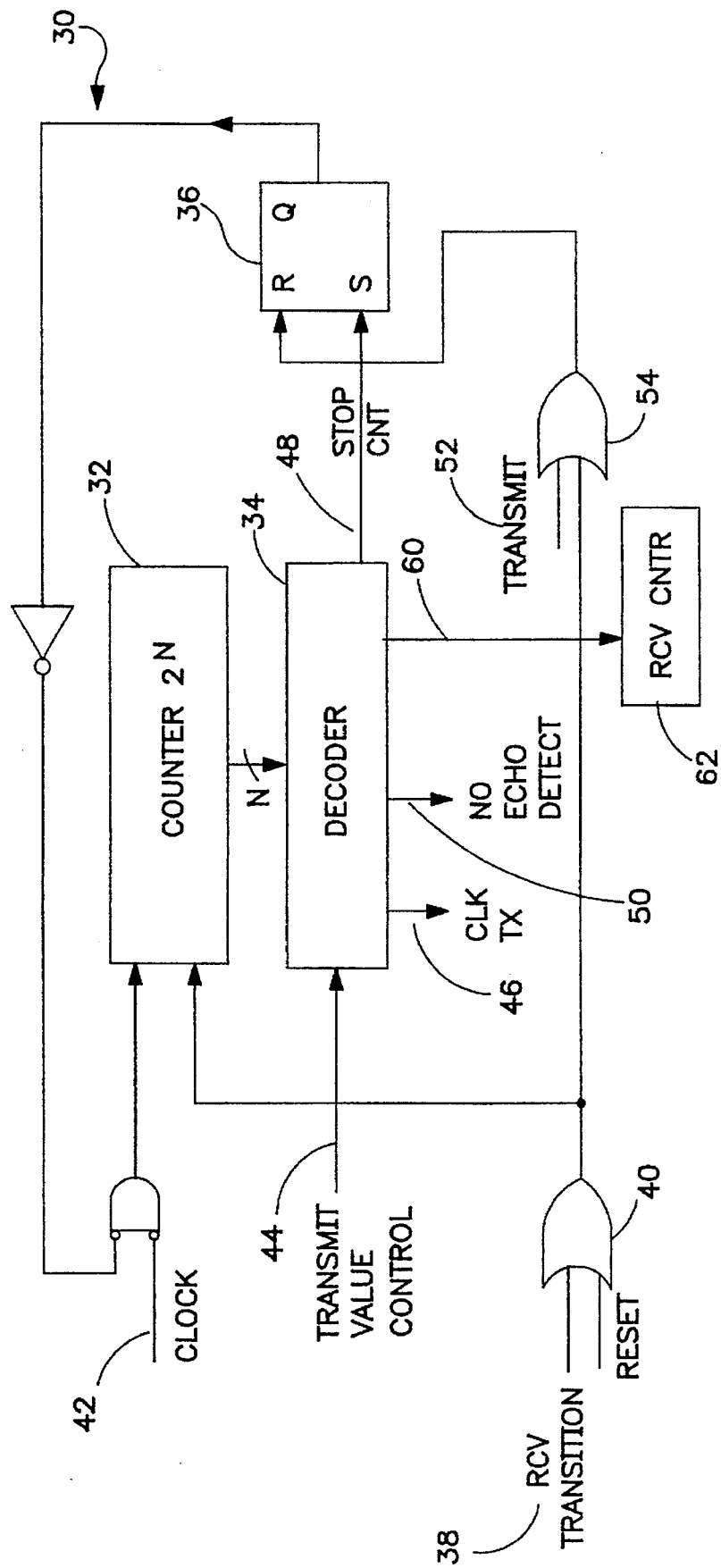
FIG. 3 is a block diagram of an embodiment of the present invention.

The circuit and method of the present invention find application in a encoder/decoder 24 of the interface 16 in a data communication system. With reference to FIG. 3, an embodiment 30 of the present invention may include a binary counter 32 and corresponding decoder 34 responsive to receipt of bit transitions for measuring received bit duration, to transmission of bit transitions, and to receipt of reflections of the transmitted bit transitions from a bus. Embodiment 30 indicates when the next bit transition is to be transmitted after a bit transition has been received during normal operation, and indicates a fault when a reflection of the transmitted bit transition has not been received within a predetermined time count. A hold latch 36 may be provided to inhibit the counter at specific counts as detected by decoder 34.

In normal operation counter 32 is set to an initial count upon detection of a bit transition on the bus, as indicated by receipt of the receive transition signal 38 at OR gate 40. Counter 32 starts incrementing at a rate determined by the frequency of input 42 from the timer. When transmitting bits, transmit value control signals 44 provided from the logic unit to decoder 34 indicate the count at which a transmit clock signal 46 is to be generated. When a transmit clock signal 46 is generated, the next bit transition is provided to end the current bit (e.g., at a count that corresponds to one of the bit durations set forth in Table 1).

After each bit transition is sent to the bus, the transmitted bit transition will appear on the bus, and is indicated by receive transition signal 38, thereby re-initializing counter 32 and starting the sequence anew.

The count at which transmit clock signal 46 is generated to provide the next bit transition is the count corresponding to the bit duration minus the time for the bit transition to be transmitted to and received from bus 10. That is, the count is not the full bit duration, but is the bit duration less the time it takes to detect that the bit transition made it to the bus. By way of example, if the time to detect that a transmitted bit transition has been received is 25 microseconds (typical for an embodiment of the present invention operable under the J1850 standard) and the bit duration is 64 microseconds (a TV1 bit from Table 1), transmit clock signal 46 would be generated when the decoder indicates that the counter has advanced by a count of 39. The initial count set in counter 32 when the counter is reinitialized is desirably zero, although other values may be used.

When bit transitions are no longer being received, either from reflections of transmitted bit transitions or from other nodes, decoder 34 provides a stop count signal 48 to hold latch 36 for stopping counter 32 so that it does not continue to cycle. Decoder 34 may provide stop count signal 48 a predetermined count after any transmit clock signal 46 (e.g., between 275 and 350 count—320 being illustrative—in an embodiment appropriate for the J1850).

Counter 32 and decoder 34 may also be used to measure the duration of received bits. Upon receipt of a transition indicated by receive transition signal 38, counter 32 may be re-initialized to a fixed count. As counter 32 advances pulses are generated on receive clock output 60 of decoder 34. A pulse is generated at each count value which separates two adjacent bit times, such as illustrated in Table 1. The pulses may be used to increment a receive counter 62 which was previously reinitialized when counter 32 was re-initialized. When the next transition is received at 38, the value of receive counter 62 may be read as an indication of the duration of the bit received. After the value is read counter 32 and receive counter 62 may be re-initialized and the sequence repeated. Alternatively, decoder 34 may provide an output directly that indicates receive bit duration.

Counter 32 and decoder 34 may also be used to detect faults. A fault may prevent a transmitted bit transition from being sensed at the interface so that a receive transition signal 38 is not received as it should be after a transmission. The absence of a received bit transition indicates a system problem that should be indicated to a system operator.

Decoder 34 provides a no echo detect signal 50 at a predetermined time after the transmitted bit transition. In a preferred embodiment, the no echo detect signal is provided at a further count after the stop count value (recall the stop count value was 320 for the J1850 example), the further count being greater than the stop count by an amount greater than the expected delay from a transmit boundary to a receive boundary.

In the J1850 example the total count from the last received transition to the no echo detect signal may be 432. To keep counter 32 counting so that the no echo detect count can be reached, stop count signal 48 may be inhibited during the period of transmission by operation of hold latch 36. A transmit signal 52 provided to OR gate 54 and thence to hold latch 36 indicates that transmission is in progress. A further stop count signal may be provided after no echo detect signal 52 to prevent the counter from cycling (e.g., between the no echo count and a maximum count—about 448 being illustrative for the J1850 example). Note that in a properly operating system a receive transition signal 38 should be received to re-initialize counter 32 before the no echo detect count is reached, even if the count has reached the initial stop count.

Figure 4:
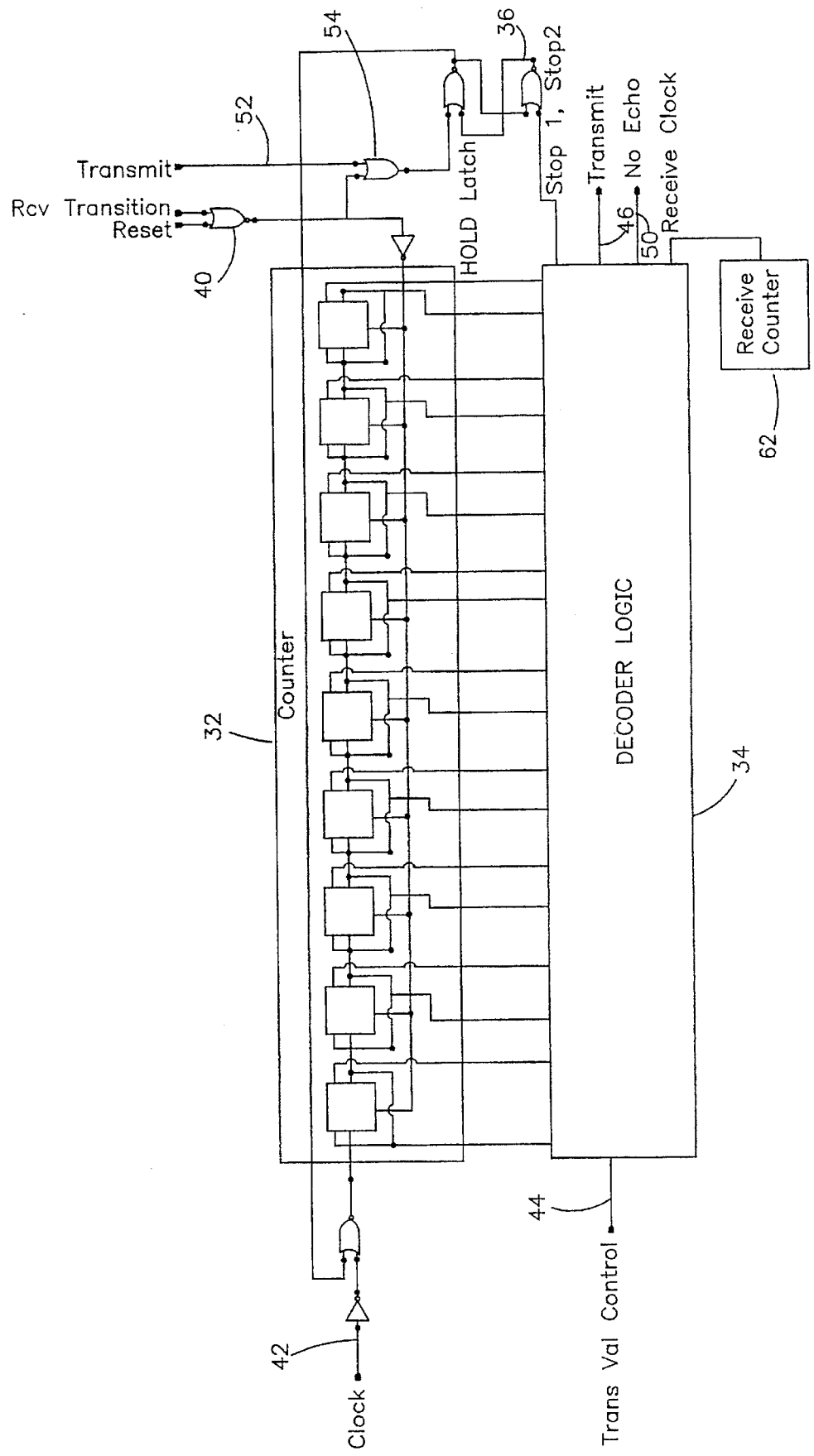
FIG. 4 is a partial block and partial circuit diagram of a further embodiment of the present invention.
Figure 5:
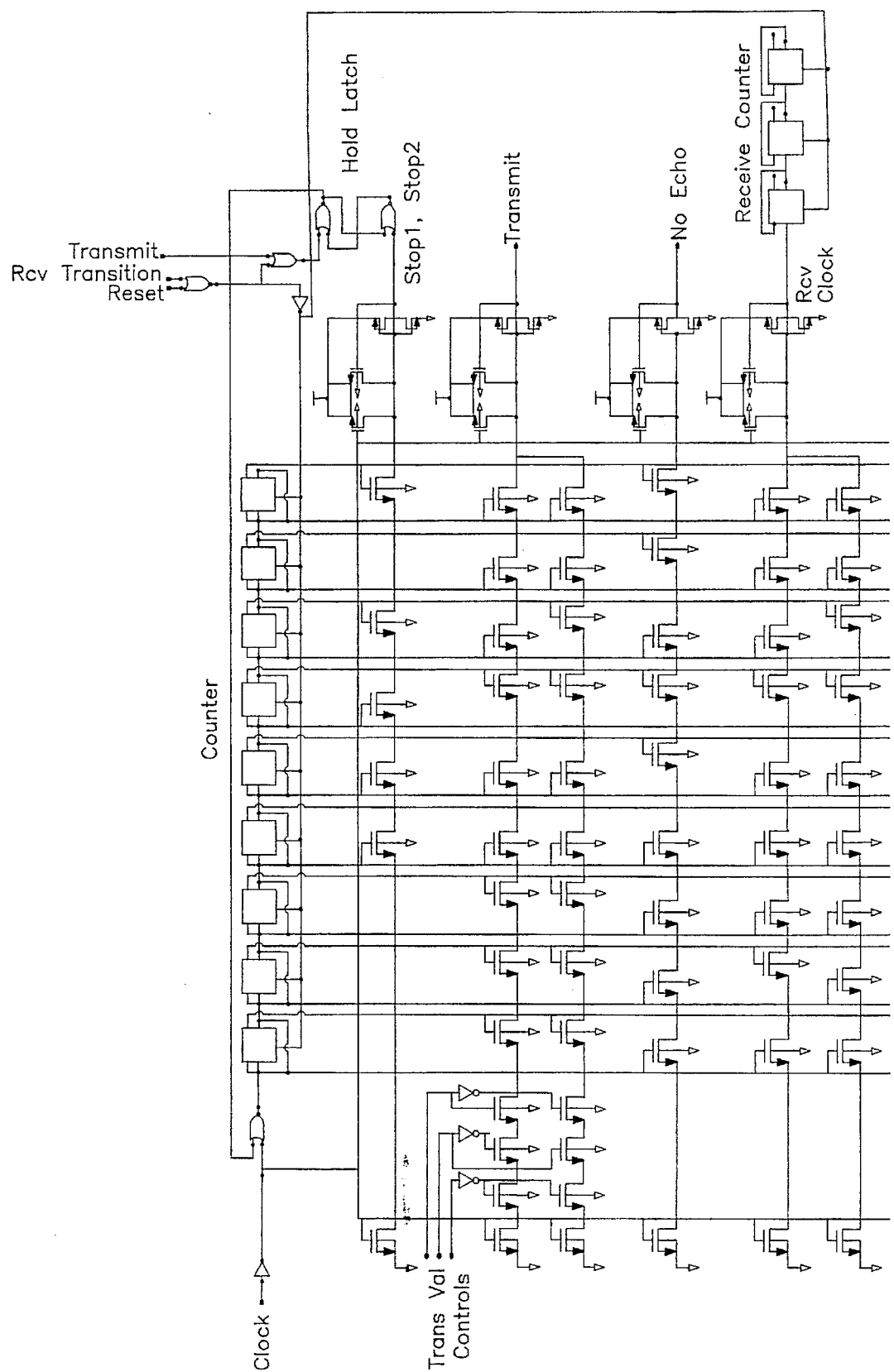
FIG. 5 is a further circuit diagram of the embodiment of FIG. 4.

A further embodiment of the present invention may be seen in more detail in FIGS. 4 and 5. Reference numbers of FIG. 3 have been retained for similar features to facilitate an understanding thereof. FIG. 5 includes a more detailed depiction of the decoder logic in decoder 34. Those of skill in the art will appreciate that the programmed logic array of decoder 34 includes two more words than a conventional counter/decoder, one for the stop counts and one for the no echo count, and thus modifications are small compared to the addition of a second counter for fault detection.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of transmitting bits of variable duration on a bus in a data communication system, each of the bits having a transition at each edge thereof, and wherein bits are defined by a combination of bit duration and bit state, the method comprising the steps of:

(a) transmitting a bit transition on the bus;

(b) receiving a reflection of the transmitted bit transition from the bus;

(c) starting a time count in a counter upon receipt of the transmitted bit transition; and (d) generating a next bit transition at the end of a time count defined by a predetermined bit duration minus a bit travel time that is the time from transmission of a bit transition to receipt of the transmitted bit transition.

2. The method of claim 1 further comprising the step of indicating a fault when a bit transition has not been received for a period of time longer than an expected bit travel time, when bits are being transmitted.

3. The method of claim 2 wherein the period of time is less than a predetermined maximum count.

4. The method of claim 1 further comprising the step of providing a first stop count signal to the counter when bit transitions have not been received for a first period of time longer than a predetermined longest bit duration, when bits are not being transmitted.

5. The method of claim 4 further comprising the step of inhibiting the first stop count signal when bits are being transmitted.

6. The method of claim 5 further comprising the step of providing a second stop count signal to the counter when bit transitions have not been received for second period of time longer than the first period of time and when the first stop count has been inhibited.

7. The method of claim 1 further comprising the step of fixing the bit travel time to a predetermined length of time for all bits.

8. The method of claim 1 wherein the predetermined bit duration is greater than about 34 microseconds and less than about 320 microseconds.

9. A method of detecting faults in a data communication system wherein bits are transmitted in a bus, each of the bits having a transition at each edge thereof, and wherein bits are defined by a combination of bit duration and bit state, the method comprising the steps of:

(a) selectively transmitting bit transitions on the bus;

(b) starting a counter when reflections of the transmitted bit transitions are received; and (c) indicating a fault when the counter indicates that a bit transition has not been received for period of time longer than a predetermined expected bit travel time.

10. The method of claim 9 wherein a fault is indicated at greater than about 432 microseconds when bits are being transmitted.

11. The method of claim 9, after the bit transition has been received, further comprising the step of providing a signal for generating the next bit transition upon the end of a time period defined by a predetermined bit duration minus a bit travel time that is the time from transmission of the bit transition to receipt of the reflected bit transition.

12. The method of claim 9 further comprising the steps of comparing a bit state of a transmitted bit to a bit state of a received bit corresponding to the transmitted bit, stopping transmission of bits when the bit state of the corresponding received bit is not the same as the bit state of the transmitted bit.

13. A method of operating a data communication system in which bits are transmitted to and received from a bus, each of the bits having a transition at each edge thereof, and wherein bits are defined by a combination of bit duration and bit state, the method comprising the steps of:

(a) transmitting a bit transition to the bus; and (b) using a multi-purpose counter responsive to transmission and receipt of reflections of the transmitted bit transitions to indicate when a bit transition has not been received, and to indicate when a next bit transition is to be transmitted after a reflected bit transition has been received.

14. The method of claim 13 wherein upon receipt of the bit transition, further comprising the step of providing a signal for generating a next bit transition at the end of a time period defined by a predetermined bit duration minus a bit travel time that is the time from transmission of a bit transition to receipt of that bit transition.

15. The method of claim 13 further comprising the step of indicating a fault when the counter indicates that a bit transition has not been received for period of time longer than a predetermined bit travel time when bits are being transmitted.

16. A method of receiving bits from a bus in a data communication system, each of the bits having a transition at each edge thereof, and wherein bits are defined by a combination of bit duration and bit state, the method comprising the steps of:

(a) receiving a first bit transition from the bus;

(b) setting a counter to a predetermined count;

(c) starting the counter;

(d) receiving a second bit transition from the bus, the second bit transition immediately following the first bit transition;

(e) storing a count from the counter; and (f) determining a bit duration, which is the time between the first bit transition and the second bit transition, from the difference between the count stored in the counter and the predetermined count.

17. The method of claim 16 further comprising the step of setting the counter to the predetermined count when storing the count from the counter.

18. A method of operating a data communication system, the method comprising the steps of:

(a) transmitting bit transitions on a bus in the data communication system;

(b) indicating receipt of bit transitions from the bus at a counter in the data communication system;

(b) counting with the counter a time period between receipt of bit transitions;

(c) indicating with the counter when a bit transition has not been received from the bus for predetermined time period; and (d) indicating with the counter when one of the bit transitions is to be transmitted following receipt of one of the bit transitions.

19. A device for transmitting bits on a bus in a data communication system, each of the bits having a transition at each edge thereof, and wherein bits are defined by a combination of bit duration and bit state, the device comprising:

means for transmitting a bit transition on the bus;

means for receiving a reflection of the transmitted bit transition from the bus; and a counter for starting a time count when the reflected transmitted bit transition is received, said counter for indicating when a next bit transition is to be transmitted at the end of a time period defined by a predetermined bit duration minus a bit travel time that is the time from transmission of a bit transition to receipt of the transmitted bit transition.

20. The device of claim 19 further comprising means for indicating a fault when a bit transition has not been received for period of time longer than a predetermined bit travel time.

* * * * *